(No Model.) 3 Sheets—Sheet 1.
H. GUELS.
VALVE FOR FLUID PRESSURE BRAKES.

No. 390,226. Patented Oct. 2, 1888.

Witnesses
G. A. Pauberschmidt
Aly. Scott

Inventor
Herman Guels
by F. W. Ritter Jr
atty (No Model.) 3 Sheets—Sheet 2.

H. GUELS.
VALVE FOR FLUID PRESSURE BRAKES.

No. 390,226. Patented Oct. 2, 1888.

(No Model.) 3 Sheets—Sheet 3.
H. GUELS.
VALVE FOR FLUID PRESSURE BRAKES.
No. 390,226. Patented Oct. 2, 1888.
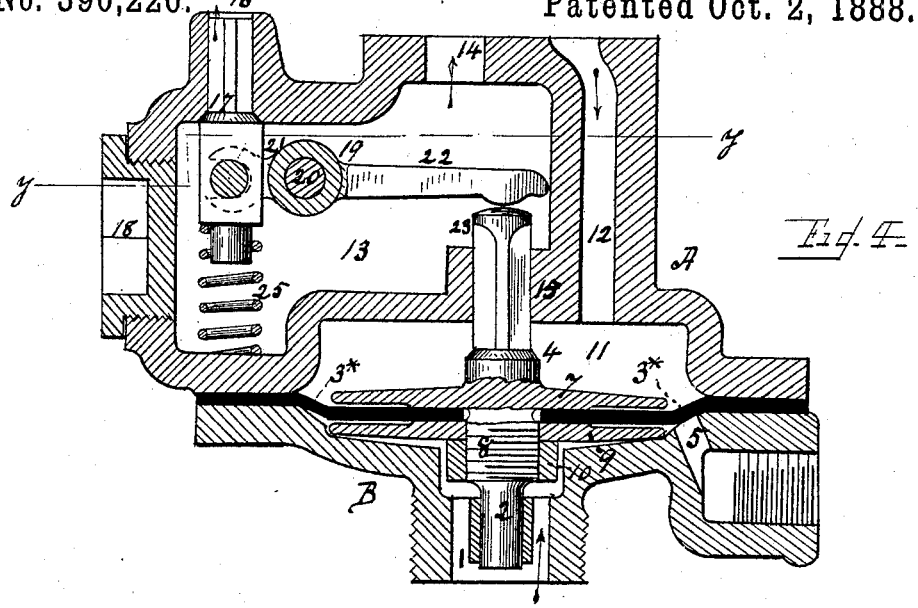
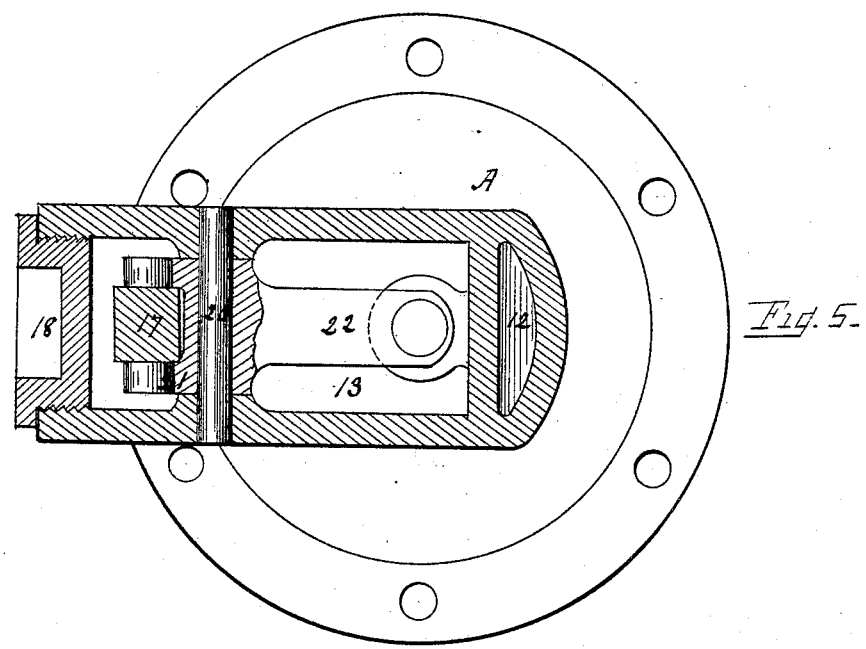

UNITED STATES PATENT OFFICE.

HERMAN GUELS, OF ST. LOUIS, MISSOURI, ASSIGNOR TO THE AMERICAN BRAKE COMPANY, OF SAME PLACE.

VALVE FOR FLUID-PRESSURE BRAKES.

SPECIFICATION forming part of Letters Patent No. 390,226, dated October 2, 1888.

Application filed April 2, 1888. Serial No. 269,343. (No model.)

*To all whom it may concern:*

Be it known that I, HERMAN GUELS, a citizen of the United States, residing at St. Louis, in the State of Missouri, have invented certain new and useful Improvements in Valves for Fluid-Pressure Brakes; and I hereby declare the following to be a full, clear, and exact description of the same, reference being had to the accompanying drawings, wherein—

Figure 1:
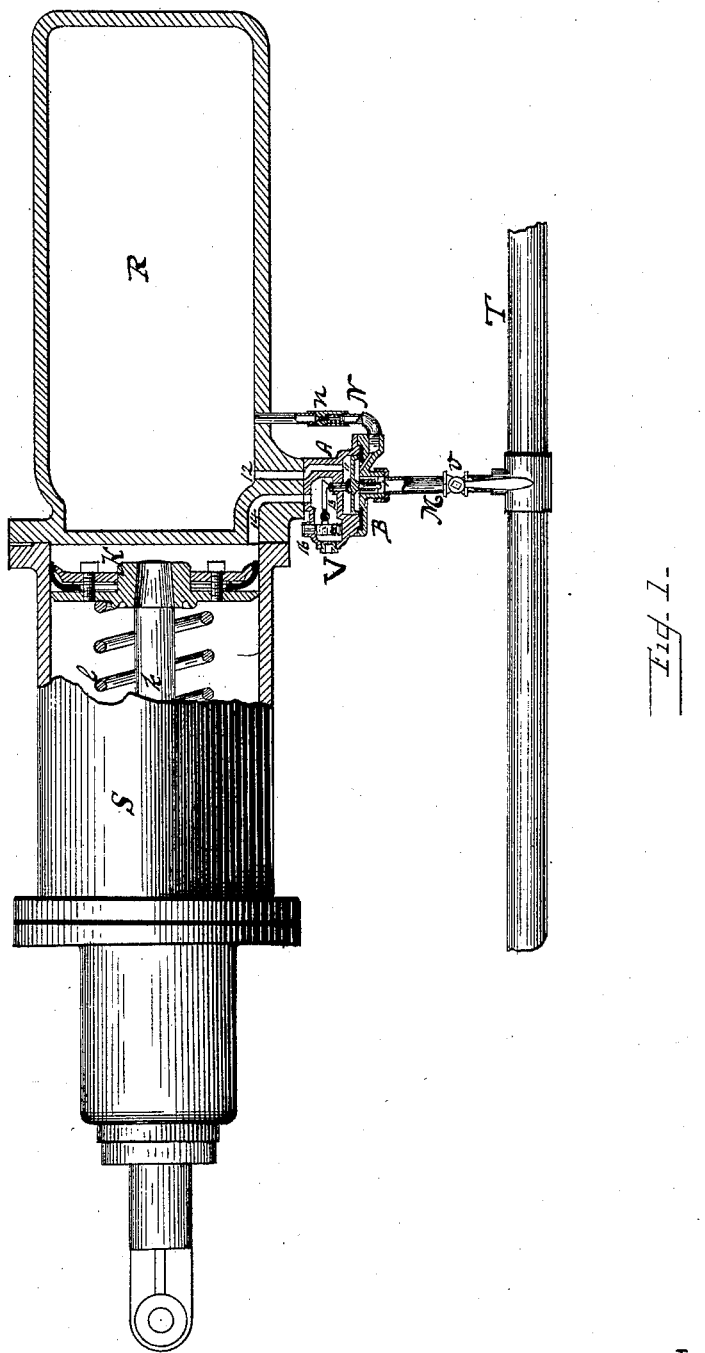
Figure 2:
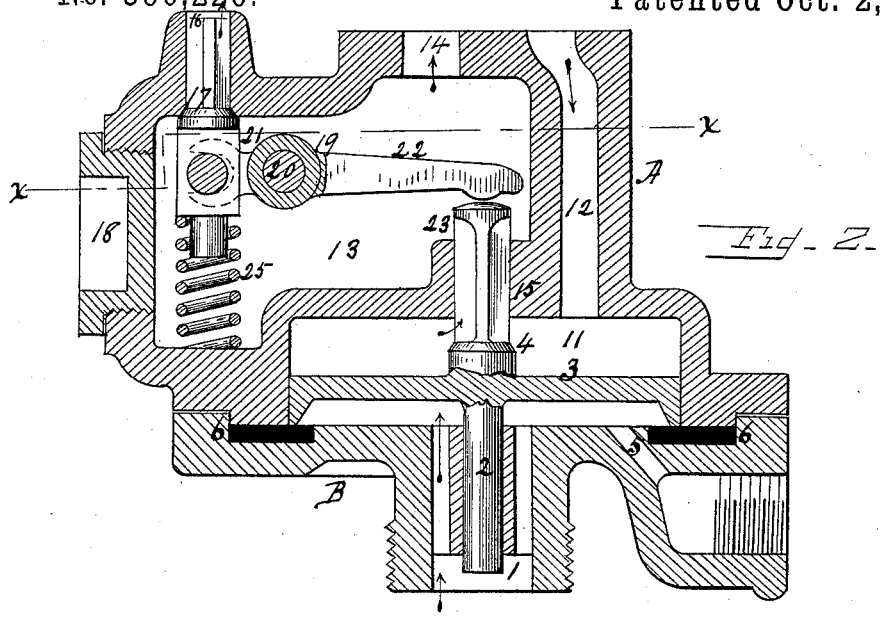
Figure 3:
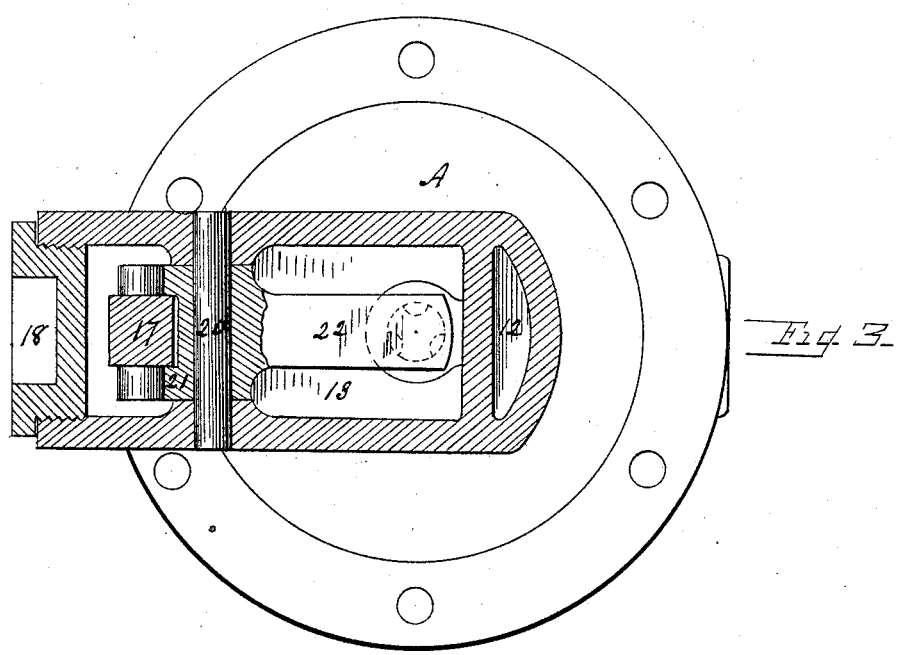

Figure 1 is a view of a portion of a train-pipe, a cylinder partly in section, an auxiliary reservoir or expansion-chamber, and a valve embodying my invention, the latter in section, showing the position of the valve in the air-brake system, and its several connections. Fig. 2 is an enlarged sectional view of the valve shown in Fig. 1. Fig. 3 is a section on the line $x\,x$, Fig. 2. Fig. 4 is a vertical section of a similar valve wherein a diaphragm is substituted for a piston; and Fig. 5 is a section on the line $y\,y$, Fig. 4.

Like letters and figures refer to like parts wherever they occur.

My present invention relates to the construction of valves for fluid-pressure brakes, and is especially applicable to what is termed the "alternate system," wherein the fluid is alternately admitted to and exhausted from the cylinder in applying and releasing the brakes. It has for its object to simplify the construction and render positive the operation of the valves; and to this end it consists, mainly, in carrying the air-passages which connect the reservoir and valve-chamber around instead of through the valve as heretofore, and in employing positive-seated puppet-valves for controlling the ports or passages leading to the cylinder, all as will hereinafter more fully appear.

I will now proceed to describe my invention more specifically, so that others skilled in the art to which it appertains may apply the same.

In the drawings, Fig. 1, T indicates a train-pipe; v, the usual valve or cock for cutting off the cylinder; M, a branch pipe leading to the expansion-chamber or auxiliary reservoir; V, the valve for controlling the ports of the cylinder and the passage between the auxiliary reservoir and cylinder; N, a branch pipe leading directly to the expansion-chamber or auxiliary reservoir; $n$, a check-valve arranged therein; R, the auxiliary reservoir or expansion-chamber, and S the cylinder with its piston K, piston-rod $k$, and piston-spring $l$.

It is to be understood that each car is to be equipped with the above devices or their equivalents relatively arranged, substantially as indicated in Fig. 1, and that in conjunction therewith a pump, main reservoir, and engineer's valve of any of the well-known or approved patterns are to be employed. The latter devices are not shown or described herein, as they form no part of the present invention and are familiar to those skilled in the art.

The shell of the brake-valve V, Fig. 1, for simplicity of construction, is preferably formed with two shell sections, A and B, (see Figs. 2 and 4,) the lower section thereof, B, having a port or passages, 1, which connects with the branch pipe M, leading from the train-pipe T, and in said port is centered the guide-stem 2 of a piston or diaphragm, 3, which carries the puppet-valve 4, that controls the port leading from the expansion-chamber or auxiliary reservoir to the cylinder. A port or passage, 5, formed in the shell-section B, connects the under side of the piston or diaphragm 3 with the branch pipe N, having check-valve $n$, leading to the expansion-chamber or auxiliary reservoir. Where the piston 3, Figs. 1 and 2, is employed, an effective packing for the sections A B of the shell and for the piston 3 may be obtained by the use of a packing-ring, 6.

In case a diaphragm, 3*, Fig. 4, is preferred, the diaphragm will form a packing between the shell-sections A B, by which it is held, and the puppet-valve 4 may have a disk or flange, 7, a thread, 8, on its guide-stem, and be secured to the diaphragm by an annular disk, 9, and nut 10, or in any other suitable manner.

The shell-section A has the piston or diaphragm chamber 11, a port or passage, 12, connecting the same with the expansion-chamber or auxiliary reservoir R, and a chamber, 13, which is connected by a port or passage, 14, with the cylinder S. The chambers 11 and 13 are connected by a port or passage, 15, controlled by the puppet-valve 4, attached to the piston or diaphragm 3, and the chamber 13 has an exhaust-port, 16, which is controlled by an exhaust-valve, 17.

18 indicates a screw-plug, which closes the opening in shell-section A by which the puppet exhaust-valve, &c., is introduced and arranged in chamber 13.

19 indicates a lever pivoted on the fulcrum-shaft 20, which crosses the chamber 13, the short arm 21 of said lever having a fork or forks, which engage pins on the stem of puppet exhaust-valve 17, while the opposite or long arm, 22, of said lever projects back or stands in the path of stem 23 of valve 4, so that the rise of valve 4 shall actuate lever 19 and trip the exhaust-valve 17.

The puppet exhaust-valve 17 may be held to its seat by the weight of long arm 22 of lever 19; but, if desired, a spring, 25, may be arranged beneath and bearing on the valve 17, as indicated in the drawings. The sections A B of the valve-shell will be bolted together or otherwise suitably connected.

The valve being of substantially the construction hereinbefore specified, will operate as follows: The air from the train-pipe enters the piston or diaphragm chamber 11 through port 1, forces the piston or diaphragm up or over until puppet-valve 4 closes port 15, then passes through 5 and pipe N to reservoir R, and thence by passage 12 to the opposite side of piston or diaphragm. The valve 4 being seated on its port 15, the exhaust-valve is held open by stem 23 acting on lever 19, and the brakes are off. To apply the brakes, the engineer's valve is operated to allow the escape of air from and the reduction of pressure in the train-pipe, which results in a corresponding reduction of pressure on that side of piston or diaphragm 3 and permits the expansion of the air in the auxiliary reservoir to press down the piston, &c., and open valve 4 and stem 23, releases the lever 19, and allows the exhaust-valve 17 to close, when the air from reservoir R passes by ports 12, 15, and 14 to cylinder S and applies the brakes. To release the brakes, the pressure is raised in train-pipe T sufficient to overcome the pressure on the auxiliary-reservoir side of piston or diaphragm 3, and the valve 4 is caused to close on its seat, cutting the auxiliary reservoir off from the cylinder at the same time that the stem 23 of valve 4 strikes lever 19 and trips the puppet exhaust-valve 17, allowing the air to exhaust from cylinder S, thus releasing the brakes.

Among the advantages of my invention are, first, the passage of the air to the reservoir around instead of through the valve; second, that during the filling of the cylinder the pressure of the air from the auxiliary reservoir tends to keep the exhaust-valve on its seat and the admission-valve off its seat; and, third, that the valves being all puppet-valves can be made to seat by a positive movement and so perfectly as to avoid all loss from leakage.

Having thus described the nature, operation, and advantages of my invention, what I claim, and desire to secure by Letters Patent, is—

1. In a fluid-brake system, the combination, with a cylinder and auxiliary reservoir, of a piston or diaphragm having an outside port or passage leading to the reservoir, said passage provided with a check-valve, a direct port or passage leading from the reservoir to the opposite side of the piston or diaphragm, a puppet admission-valve actuated by the piston or diaphragm, and a puppet exhaust-valve actuated therefrom, substantially as and for the purposes specified.

2. In a valve for air-brake systems, a valve-shell having a piston or diaphragm chamber, 11, a secondary chamber, 13, ports 1, 5, 14, 15, and 16, and puppet-valves 4 and 17, actuated by the piston or diaphragm, substantially as and for the purposes specified.

In testimony whereof I affix my signature in presence of two witnesses this 15th day of February, 1888.

HERMAN GUELS.

Witnesses:
F. W. RITTER, Jr.,
EDWIN S. CLARKSON.